No. 702,261. Patented June 10, 1902.
J. E. THORNTON.
PHOTOGRAPHIC CAMERA.
(Application filed Jan. 9, 1900.)
(No Model.) 10 Sheets—Sheet 1.
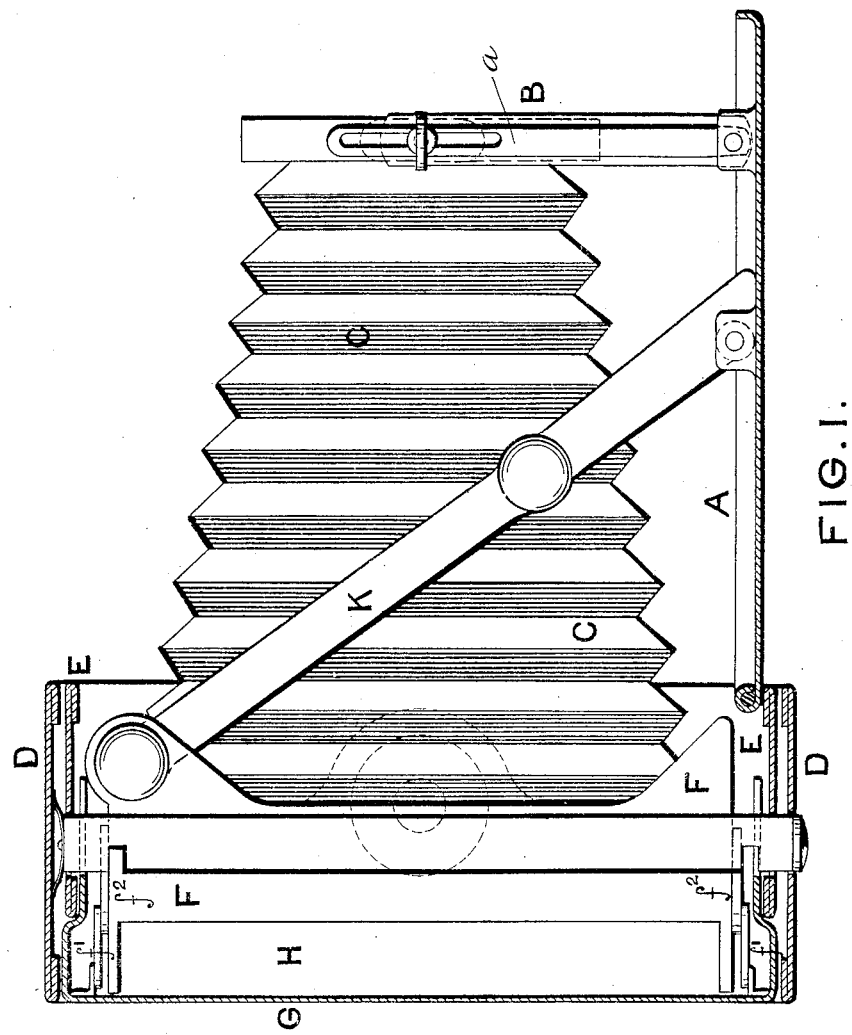
FIG. I.
WITNESSES.
E. Howard
Joseph Bates
INVENTOR.
J. E. Thornton
Howard O'Brien
atty.

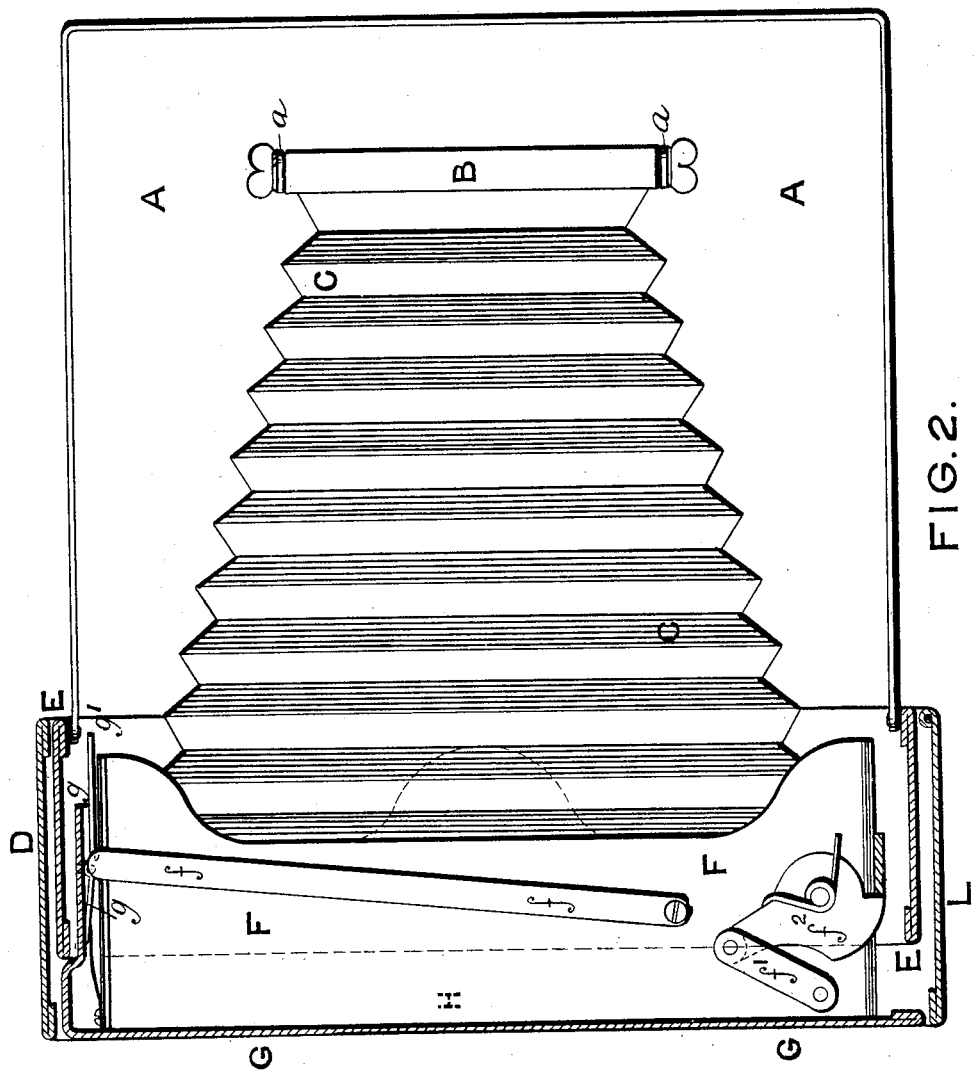

No. 702,261. Patented June 10, 1902.
J. E. THORNTON.
PHOTOGRAPHIC CAMERA.
(Application filed Jan. 8, 1900.)
(No Model.) 10 Sheets—Sheet 3.
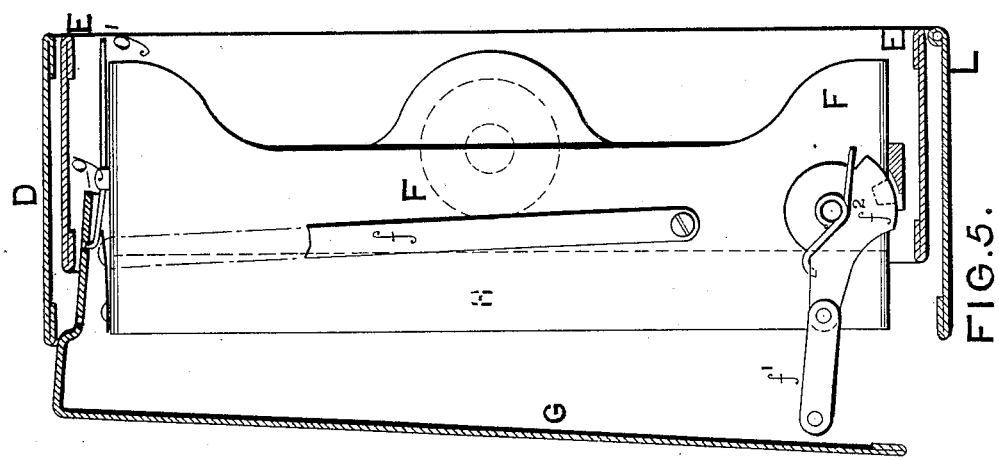
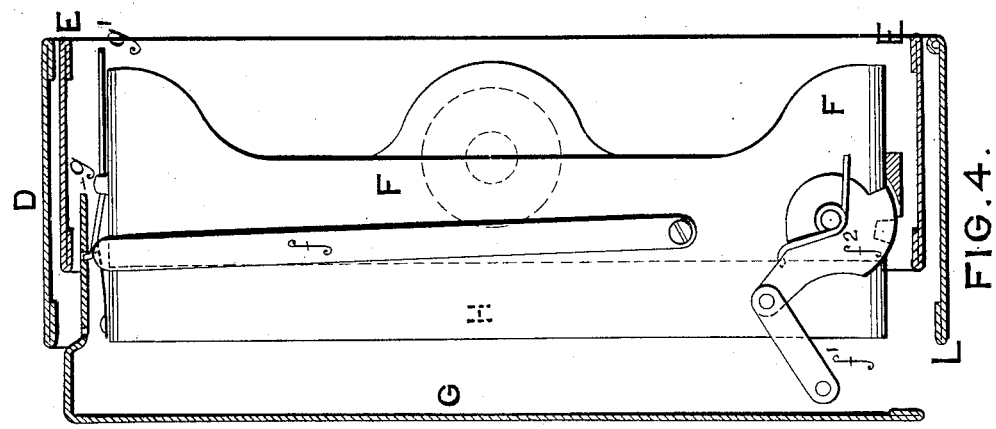
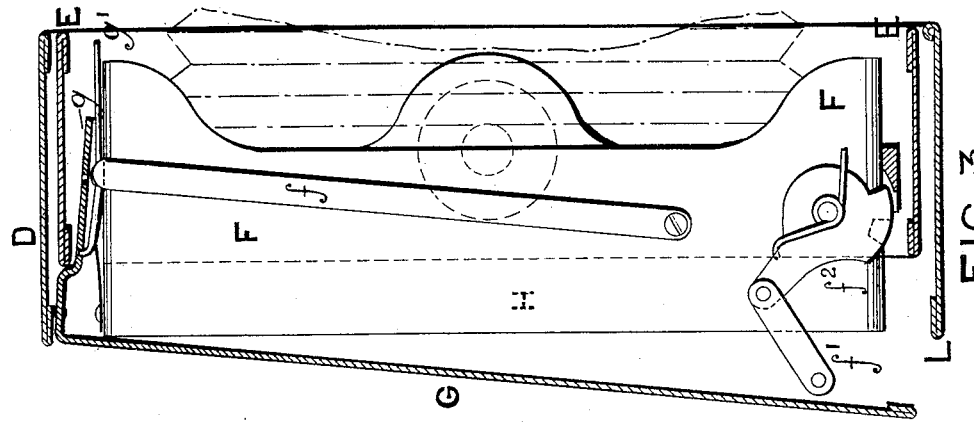
WITNESSES. INVENTOR.

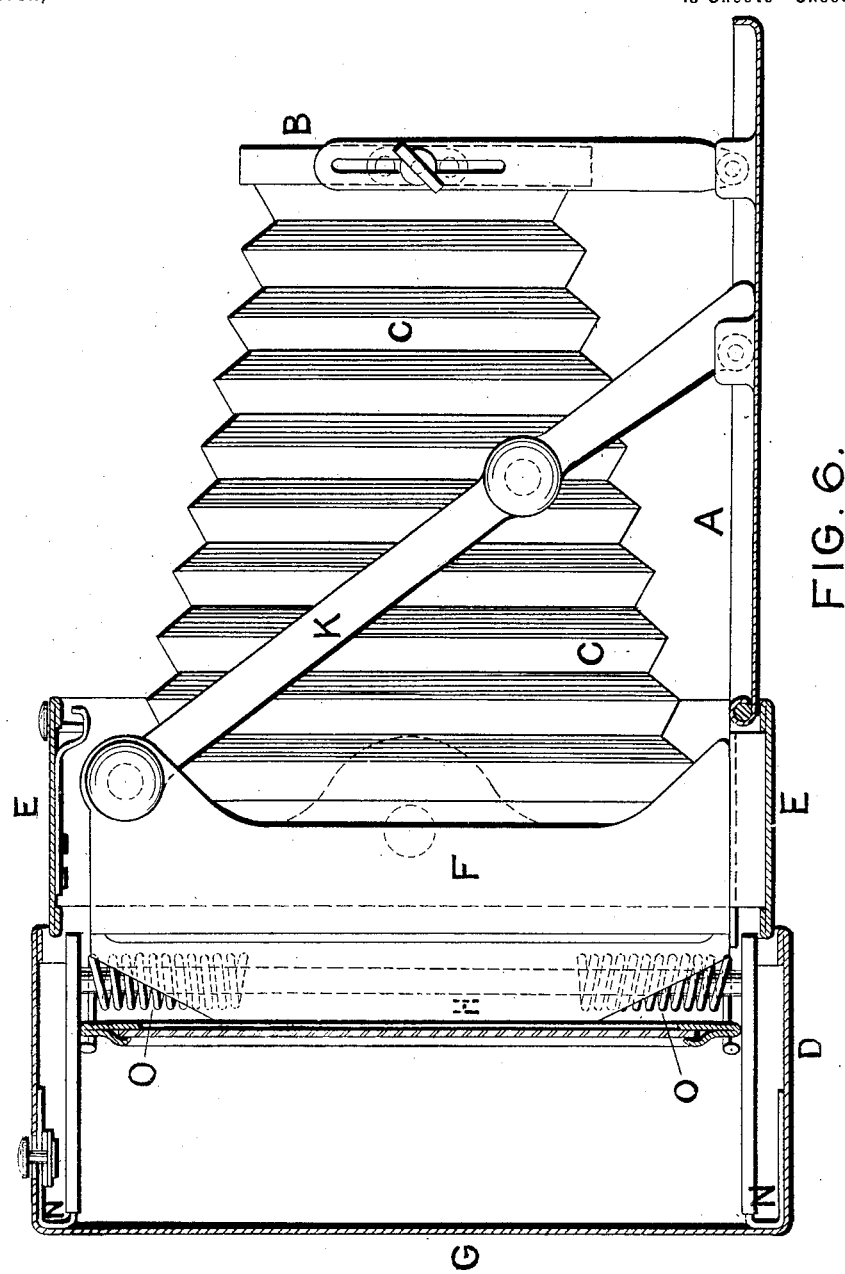

No. 702,261. Patented June 10, 1902.
J. E. THORNTON.
PHOTOGRAPHIC CAMERA.
(Application filed Jan. 8, 1900.)
(No Model.) 10 Sheets—Sheet 5.

WITNESSES.
E. Howard.
Joseph Bates.

INVENTOR.
J. E. Thornton
by F. Dow and O'Brien
atty.

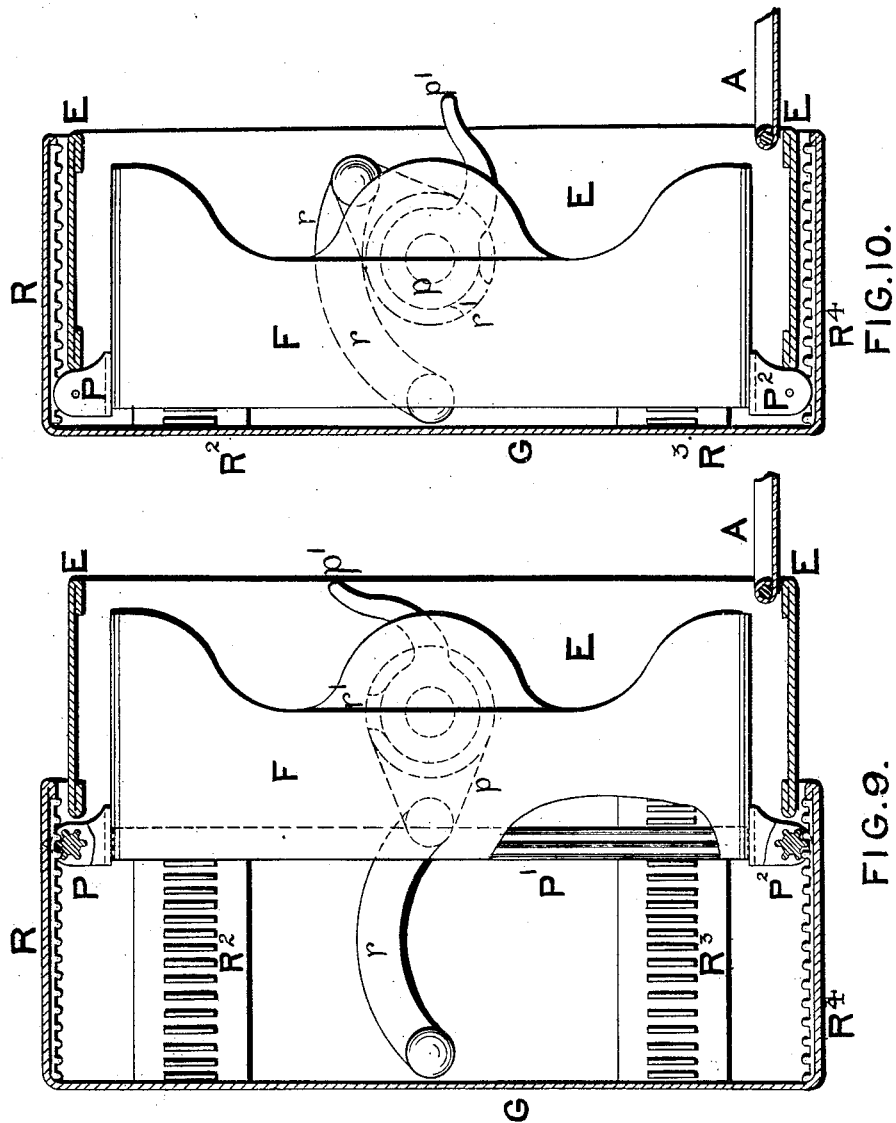

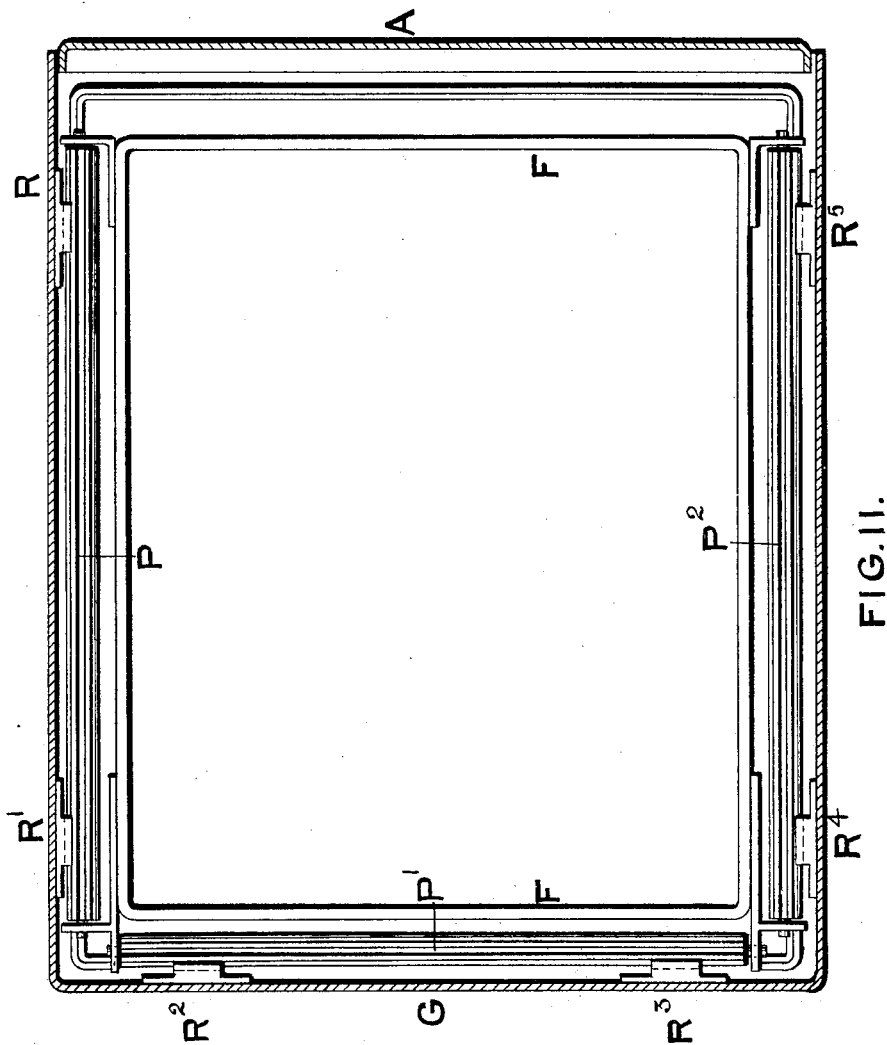

No. 702,261. Patented June 10, 1902.
J. E. THORNTON.
PHOTOGRAPHIC CAMERA.
(Application filed Jan. 8, 1900.)
(No Model.) 10 Sheets—Sheet 9.
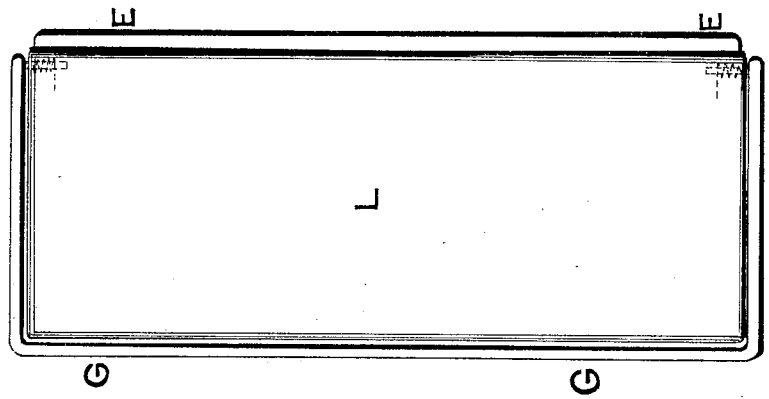
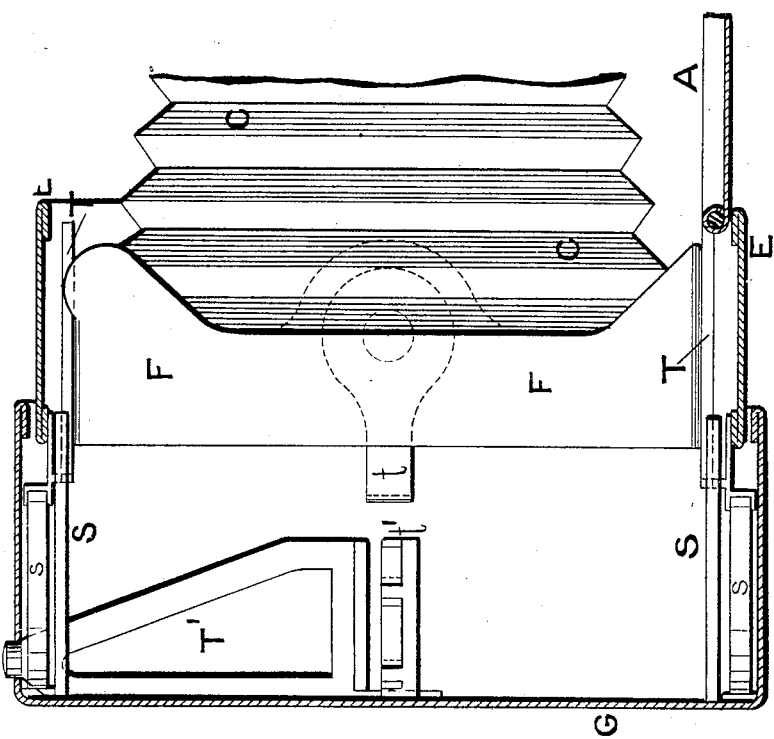
WITNESSES.
E. Howard
Joseph Bates.
INVENTOR.
J. E. Thornton No. 702,261. Patented June 10, 1902.
J. E. THORNTON.
PHOTOGRAPHIC CAMERA.
(Application filed Jan. 8, 1900.)

(No Model.) 10 Sheets—Sheet 10.

WITNESSES. INVENTOR.

UNITED STATES PATENT OFFICE.

JOHN E. THORNTON, OF MANCHESTER, ENGLAND.

PHOTOGRAPHIC CAMERA.

SPECIFICATION forming part of Letters Patent No. 702,261, dated June 10, 1902.

Application filed January 8, 1900. Serial No. 719. (No model.)

*To all whom it may concern:*

Be it known that I, JOHN EDWARD THORNTON, a subject of the Queen of Great Britain, residing at Manchester, in the county of Lancaster, England, (whose postal address is Worsley Mills, Hulme, Manchester, aforesaid,) have invented certain new and useful Improvements in Photographic Cameras, of which the following is a specification.

This invention relates to that class of cameras known as "folding hand-cameras," constructed with a base-board, to one end of which a body or back is hinged and at the other end the front, the body and front being connected by bellows. The body carries or incloses the sensitive plate or film and the front when the camera is folded, and the front carries the optical system, comprising the lens and shutters and their accessories.

It is designed to provide a hand-camera which can accommodate in the body one, two, or three plate-holders or a roll-holder or a plate-magazine, as may be required by the operator, but without the said chamber, and therefore total thickness and bulk of the camera, being any larger than necessary when in use.

The invention consists, essentially, in constructing the body of the camera with the back capable of moving or expanding to enlarge the chamber into which the carrier for the sensitive material is placed, so that it may accommodate different sizes or numbers of such carriers and be closed down to the smallest size necessary. It will be fully described with reference to the accompanying drawings.

Figure 7:
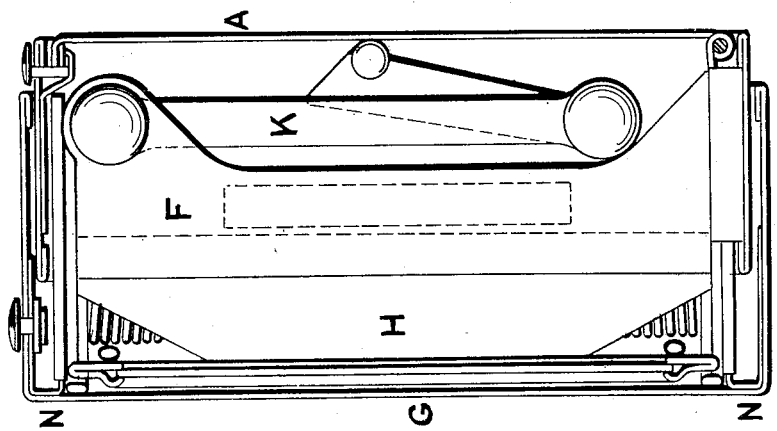
Figure 8:
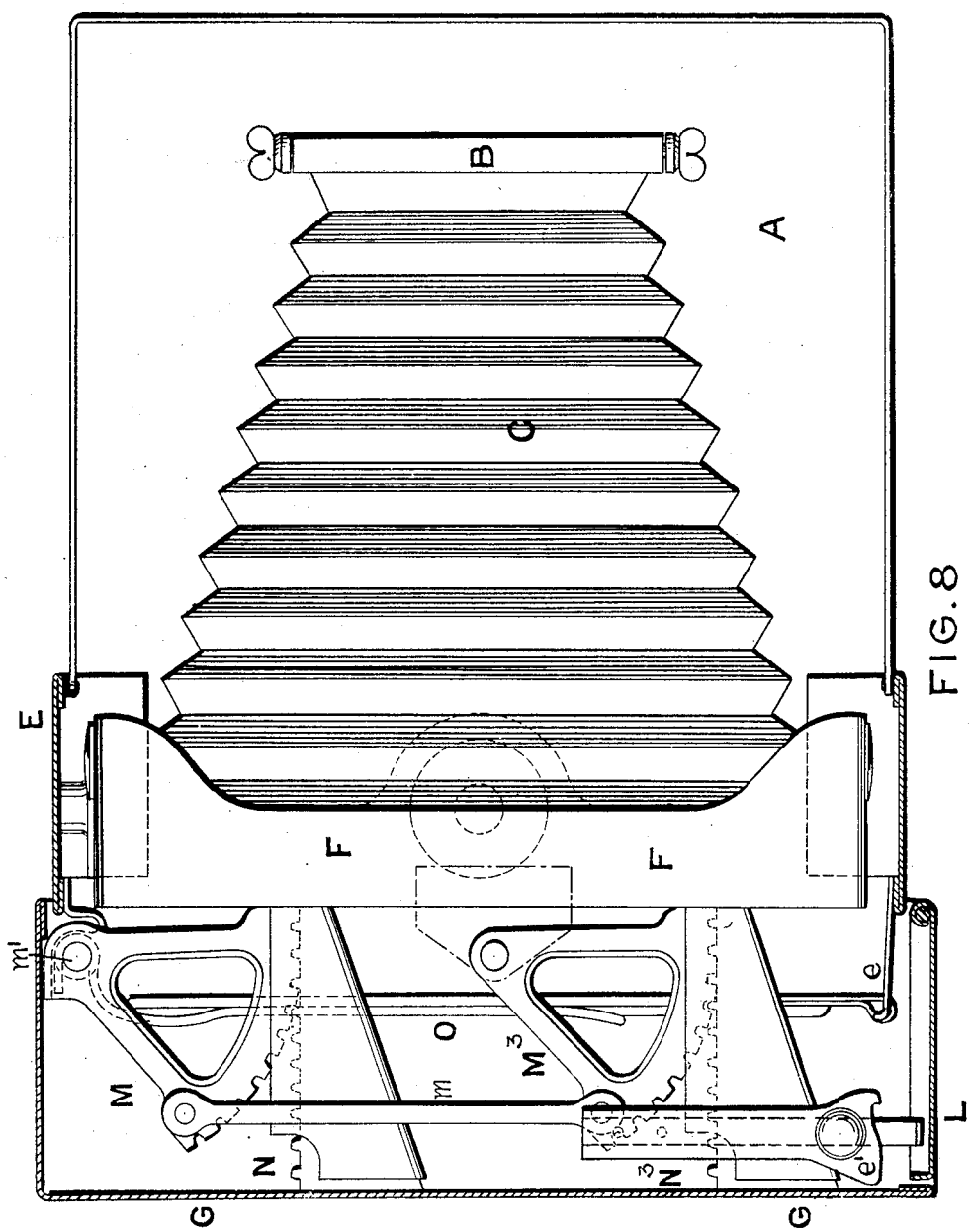
Figure 15:
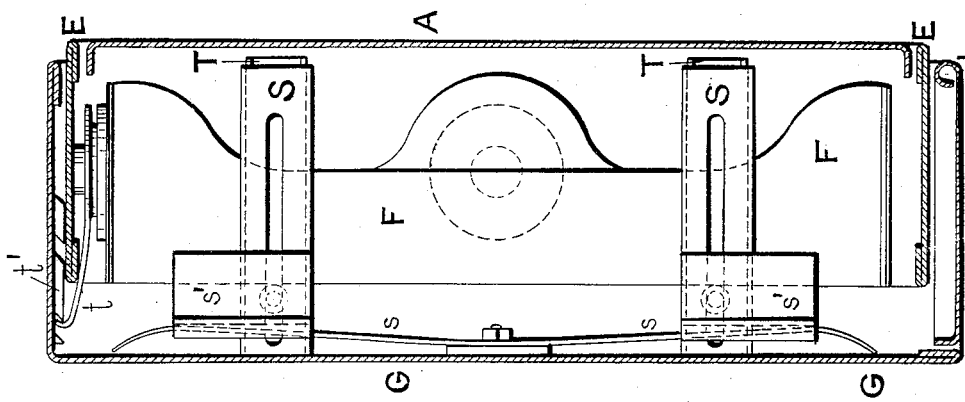
Figure 14:
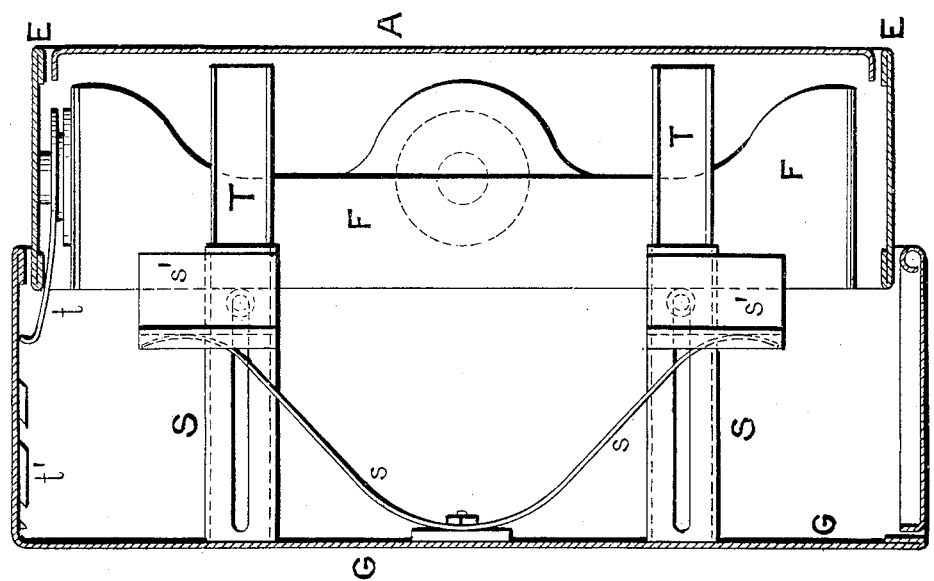

Figure 1 is a side elevation, partly in section, of camera constructed in accordance with the invention, showing the back in its closed or non-expanded position. Fig. 2 is a sectional plan of same. Fig. 3 is another sectional plan of Fig. 1, showing the back expanded only sufficiently to accommodate one double plate-holder and also inclined to a convenient angle to facilitate insertion of the plate-holder. Fig. 4 is a similar plan to Fig. 3, showing the back expanded further in order to accommodate a roll-holder or two double plate-holders; Fig. 5, a plan showing back expanded to the same extent as in Fig. 4 and inclined to allow of the easy removal and replacement of the roll-holder or of the plate-holders. Fig. 6 is a side elevation, partly in section, of camera, showing a modified arrangement for operating the expansible back with the back expanded or extended. Fig. 7 is a side elevation in section of the arrangement shown in Fig. 6, with the back in its closed position. Fig. 8 is a plan of same, partly in section, with the parts in position as shown in Fig. 6. Fig. 9 is a side elevation, partly in section, showing another modification of mechanism for operating the expansible back with the back expanded. Fig. 10 is a side elevation of same with the back closed. Fig. 11 is an elevation in section from the back, showing same mechanism as Figs. 9 and 10. Fig. 12 is a side elevation in section showing another modification of expansible back with the back in its expanded position. Fig. 13 is a side elevation in section of same when closed. Fig. 14 is a sectional plan of same when open, Fig. 12. Fig. 15 is a sectional plan of same when closed.

In all these several figures the principal parts of the camera are alike and are marked with the same letters of reference.

In constructing the camera I prefer to construct the chief parts, which are not subjected to much wear and tear, of sheet-aluminium, the other parts being made of hard brass. Other materials (including wood) may be used where desirable; but the use of metal permits of great lightness, combined with stiffness and rigidity, and also cheapness and accuracy in production.

The camera comprises the base A, the front B, the body D, and the bellows C, connecting the front and the body. The base A is hinged to the body D, and the front B is hinged or pivoted to the base A by the uprights $a$ in the usual way. The body I construct of three parts—a rigid frame or case E of rectangular form, a second or foundation frame F, placed inside the frame or case E and rigidly attached thereto, and a back G, capable of sliding to and fro in or on the others to give the desired size to the compartment H, which receives the carrier of the sensitive material.

The foundation-frame F is rigidly attached to the case E, and to it are connected or fixed the several movable or operative parts of the camera. The base-board A is hinged or pivoted to the bottom edge of the case E and to the foundation-frame F, and the bellows C are attached to it, and the stretchers K are also pivoted at one end to the foundation-frame. It will thus be understood that the foundation-frame F, the base-board B, the bellows C, and the stretchers K are all erected as one complete piece of apparatus and are then secured in correct position by means of the foundation-frame F in the case E.

The back G, with case E, forms a double box or case, one sliding or telescoping within the other. The back G forms a box or case to contain the plate-holders or roll-holder for flexible material and is open at one side, provided with a lid or door L to permit of their insertion or withdrawal. The door is pivoted at one edge and provided with a spring $l$ to cause it to open when released, being held closed by a catch $l'$. The back G when in its closed position holds one plate-holder and when in its extended or expanded position holds a roll-holder or three plate-holders, which are about the same size. The back G may be closed entirely if a focusing-screen is not used, or if one is used the back of the case may be provided with an opening closed with a spring door or doors and folding side wings or flaps, all as are well known for focusing-hoods.

In the arrangement shown in Figs. 1 to 5 the back G is provided with a second inner frame $g$, which passes into the interior of the case F. It is supported by a radial link $f$ and is held in position by a spring-catch $g'$, attached to the foundation-frame H, which engages with a series of notches in the frame $g$ to hold it in the desired position. At the side next to the aperture it is connected to the foundation-plate by links $f'$ $f^2$, which permit of the one side opening in advance of or beyond the other to facilitate the insertion and removal of the holders and of being moved back into a position square and parallel with the foundation-plate F, which is necessary for photographic purposes.

In the arrangement shown in Figs. 6 and 8 the back G slides to and fro over the case E. To insure a parallel movement between the two parts, I employ two quadrants M M', connected together by a link $m$ at the bottom of the camera-body engaging with racks N N', and two similar quadrants M² M³ at the top of the camera-body engaging with racks N² N³. The top quadrants are connected to the bottom ones by uprights $m'$. The quadrants are pivoted to the foundation-frame or to the case E, and the racks are attached to the movable or expansible back G. Hence any movement of the quadrants or any movement of the back with the racks is equally transmitted to all the parts, causing a parallel movement of the back G in relation to the case E and foundation-frame F. To give an automatic movement to the back G when released, springs O are applied to one or more of the quadrants, preferably to all four, which cause them to move in relation to the foundation-plate E and force the back outward. The back G when in its closed position is held against the action of the springs by the hook or catch $e$ engaging the spring-catch $e'$. By depressing the spring-catch $e'$ the back is released and springs back into the expanded position. The spring-door L is opened to admit the introduction of the plate-holder or roll-holder.

In the arrangement shown in Figs. 9 to 11 I pivot to the foundation-plate F three long fluted rollers or pinions P P' P², which engage with racks R R' R² R³ R⁴ R⁵, attached to the inner surface of the movable expansible back G. Any movement of the back G causes the rotation of the pinions in the racks and insures an even or parallel movement. The back G is moved in one direction or the other by the crank or eccentric $p$ and the link $r$. The back G is held in the desired position by the handle or lever $p'$ of the eccentric $p$ engaging in notches $r'$.

In the arrangement shown in Figs. 12 to 15 the expansible back is provided with slides S, and to the foundation-frame F are attached corresponding slides or guides T, over which the slides S fit and slide, thereby maintaining the back G parallel with the case E. The back is pressed outward by the springs $s$, attached thereto and bearing against the spring-blocks $s'$, attached to the foundation-frame F. The back G is held in the desired position by the spring-catch $t$ engaging with the notches $t'$, the catch $t$ being released when required by the sliding piece T', attached to one side of the back G. By pressing down the sliding piece T' the wedge-shaped end comes under the end of the catch $t$ and raises it out of the notches $t'$, thereby permitting the back to expand under the action of the springs T.

The edges of the base-board, body-frames, and other parts are turned over, so as to form strengthening-rims, which enable very thin metal to be used and yet secure the necessary stiffness and strength.

The outside of the case E, back G, and base-board C may be covered with leather, which may be cemented thereto, but still further secured by being clamped by the turned-over edges aforesaid. The inside of the body and base-board may be finished in any suitable way or by any suitable flexible covering; but I prefer to either attach a thin covering of polished mahogany veneer or else to print or color the metal in imitation of that wood or to attach a veneer of such printed metal.

What I claim as my invention, and desire to protect by Letters Patent, is—

1. In a camera the combination with the base A, the front B, bellows C and casing E connected together, of the sliding expansible back G connected thereto, the second inner frame $g$, the links $f$ by which it is suspended, and the links $f'$ $f^2$ to permit of it opening wider at the aperture to receive the holder, substantially as described.

2. In a photographic camera, a body consisting of a rigid frame E, a foundation-frame F within the frame E, said foundation-frame F suitably connected to the frame E, and a back G adapted to slide within the said frames, in combination with a base A connected to the body and a bellows and front B suitably connected to the base and to the body.

3. In a photographic camera, a body consisting of a frame, a foundation-frame F suitably attached to the said frame, a back G sliding within the said frames, and an inner frame $g$ for the said back, in combination with means connected to the foundation-frame and engaging with the back adapted to permit of one side of the back opening in advance of the other, and a bellows suitably connected to and supported by the body portion.

4. In a photographic camera, a frame E, a foundation-frame F suitably attached thereto, a back G sliding within the said frames, means connected to the frame F and engaging the back G for permitting one side of the back opening in advance of the other side, in combination with a bellows suitably connected with and supported by the said frames.

In witness whereof I have hereunto signed my name in the presence of two subscribing witnesses.

J. E. THORNTON.

Witnesses:
J. OWDEN O'BRIEN,
JOSEPH BATES.